Figure 1:
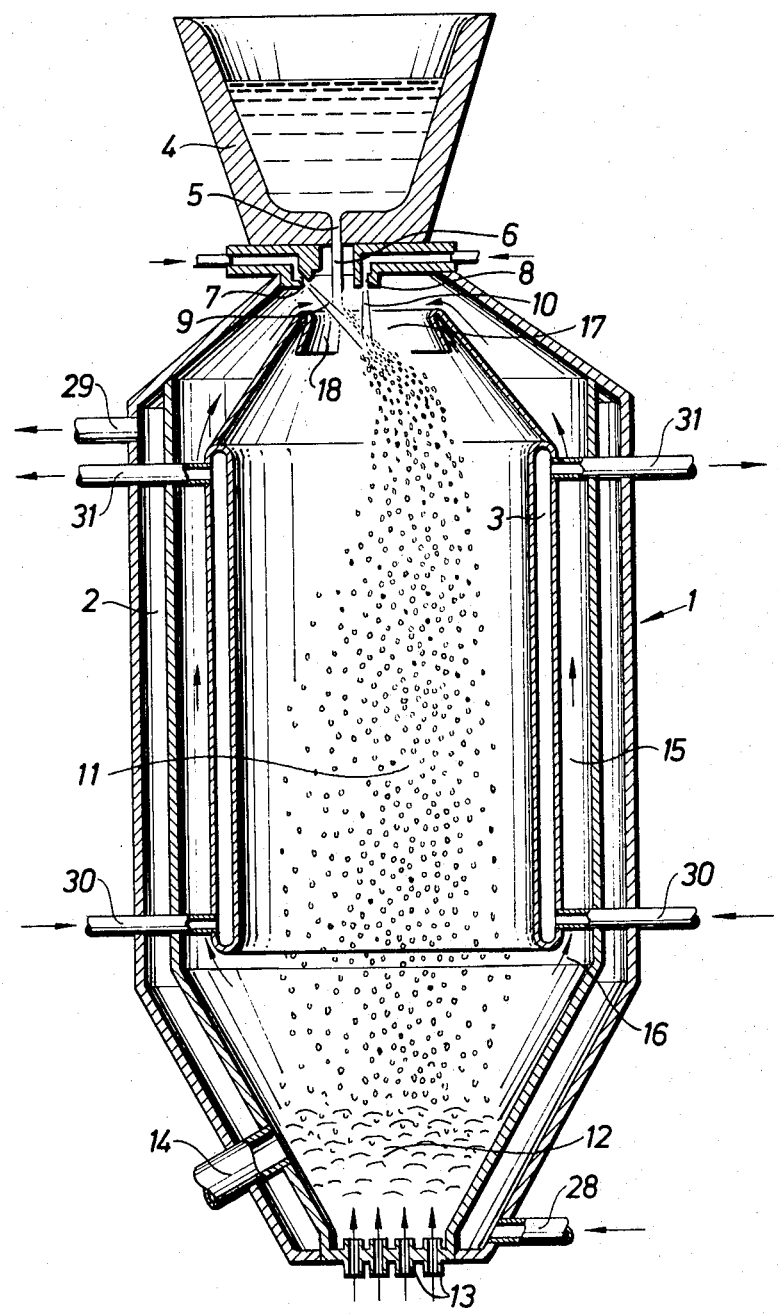

United States Patent [19]
Hellman et al.

[11] 3,771,929
[45] Nov. 13, 1973

[54] MEANS FOR CONTINUOUSLY COOLING POWDER PRODUCED BY GRANULATING A MOLTEN MATERIAL

[75] Inventors: Per Hellman, Soderfors; Erik Anders Ake Josefsson, Borlange, both of Sweden

[73] Assignee: Stora Kopparbergs Bergslags Aktiebolag, Falun, Sweden

[22] Filed: Dec. 5, 1972

[21] Appl. No.: 312,379

Related U.S. Application Data

[62] Division of Ser. No. 97,991, Dec. 14, 1970, abandoned.

[30] Foreign Application Priority Data
Dec. 15, 1969   Sweden.............................. 17286/69

[52] U.S. Cl...................................... 425/7, 264/12
[51] Int. Cl.............................................. B22d 23/08
[58] Field of Search.................................. 425/7;

264/12-14

[56] References Cited
UNITED STATES PATENTS

| 2,284,023 | 5/1942 | Scripture .......................... 264/12 X |
| 3,428,718 | 2/1969 | Helin et al. ...................... 264/12 X |
| 3,588,951 | 6/1971 | Hegmann.............................. 425/7 |

*Primary Examiner*—Robert D. Baldwin
*Attorney*—Henry W. Koster

[57] ABSTRACT

A powder is produced by atomizing molten material by means of a jet of an atomizing fluid. The atomizing zone is surrounded by a wall defining a comparatively narrow passageway, to the effect that the jet of atomizing fluid will act as a jet pump creating a circulation of the gas in the atomizing chamber. Means are provided for cooling said gas.

1 Claim, 2 Drawing Figures

MEANS FOR CONTINUOUSLY COOLING POWDER PRODUCED BY GRANULATING A MOLTEN MATERIAL

This is a divisional of Application Ser. No. 97,991 filed Dec. 14, 1970, now abandoned.

The present invention relates to apparatus for manufacturing powder by atomizing a molten material in which a tapping stream or jet of the molten material is atomized or broken into fine drops when it comes into contact with an atomizing agent, normally a fluid, which is directed under high pressure in the form of jets against the stream of molten material.

The requirements of a powder vary with the field of use. The basic properties of the powder are determined by its chemical composition, the distribution of particles of different sizes and the shape and microstructure of the particles. The chemical composition is dependent on the composition of the original material and any oxidation or reduction of this material during the pulverizing process itself. The size and shape of the powder particles are substantially dependent on how atomization of the molten material is carried out, whereas the microstructure is to a great extent dependent on how the drops obtained during atomization are cooled. The shape of the powder particles is also dependent on how the drops are cooled since drops which knock against a hard object before they have had time to solidify will be deformed. In the process of manufacturing a powder by atomizing a molten material, therefore, the powder is usually collected at the bottom of a bath of coolant, normally consisting of water. However, such water baths cause the powder obtained to be oxidized on the surface and in many cases it is therefore desirasble to cool the drops while falling freely in some sort of inert atmosphere until they have completely solidified and cooled so that there is no longer any risk of the particles being deformed or sticking together. When a material having a high melting point, for example metal, is atomized the quantity of heat which must be removed before the drops have solidified is quite considerable, and since the particles furthermore may not come into contact with any solid object during the solidification process, the distance which the drops must fall freely before they solidify is relatively long if no other steps are taken. This means that the atomization chamber in which the atomization takes place must be made extremely high.

The present invention relates to means for accelerating the cooling of powder manufactured by the atomizing of a molten material. The invention is principally intended for use in the manufacture of powder from alloyed steel for producing compact steel by sintering the powder under pressure. Of course, the invention may also be used in all other cases where powder is produced by atomizing a molten material. One of the reasons which makes the method and means according to the invention particularly suitable for the manufacture of powder from alloyed steel is that in the manufacture of such powder it is extremely important that the powder is entirely free from oxide as it is not usually possible to deoxidize the powder before it is used. (Alloyed steel usually contains alloying elements which form extremely stable oxides which are very difficult to reduce). Powders which are to be used for the pressure-sintering of powder bodies should also have spherical particles with a smooth surface without bubbles or cavities. A spherical particle shape simplifies the sintering process, since compact powder bodies can be obtained by means of a relatively simple pre-pressing process, and these bodies can then be sintered to form compact steel bodies.

When manufacturing metal powder by atomizing a molten material, a stream of the molten metal is usually disintegrated by directing one or more jets of some suitable atomizing agent, normally a fluid, for example a gas or liquid or a mixture of gas and liquid, under high pressure and at an acute angle against the stream of molten metal so that this is split up into fine metal particles or drops which are collected after they have been cooled to such an extent that they have solidified and reached such a temperature that there is no longer any risk of the metal particles sticking together. Generally, the jets of atomizing agent are aimed from several sides against the stream of molten metal so that all the jets intersect each other at substantially the same point. However, it is extremely difficult to get several jets of atomizing agent to intersect the stream of molten metal at the same level. Usually, therefore, the stream of molten metal will come into contact with one of the fluid jets immediately adjacent their point of intersection. It has been found that this kind of poor centering of the jets has an extremely negative effect on the quality of the powder obtained, and on the atomizing process, but that a considerable improvement of the disintegration of the molten material can be achieved if the stream of molten material is first intersected by a thin, sharp fluid jet, wider than the stream of molten material, and having such high kinetic energy that it forces the stream of molten material to alter direction and spread out into a layer on top of the fluid jet, and then when the direction of the melt has thus been altered, it is intersected by another fluid jet having greater width than the metal layer obtained, so that the melt is split up into free droplets. This method is further described in our Pat. application Ser. No. 94,148 filed Dec. 1, 1970 assigned to a common assignee.

According to the present invention the jets of atomizing fluids are used to effect an internal gas circulation in the atomizing chamber so that the cooling of the molten particles is accelerated. It is proposed that the top of the atomizing chamber is shaped as a jet pump, so that the movement of the fluid jets causes a suitable coolant, preferably an inert gas, to circulate through the atomizing chamber. The atomizing chamber is kept suitably filled with the coolant, which may for example be argon, and, if being continuously cooled by being brought to circulate through a heat-exchanger, this coolant will considerably accelerate the solidification and cooling of the drops. When this method is used, the atomizing chamber can be built considerably shorter without its general construction becoming much more complicated. In its most simple design the invention requires no additional supply of energy besides that necessary for circulation of a suitable cooling agent through the heat-exchanger. Of course, the gas circulation in the atomizing chamber can be further improved by introducing a circulation pump in the system, or a circulation pump may be inserted parallel to the gas circulation obtained by means of the jet pump. The atomizing chamber can be made even shorter if the lower part is provided with a fluidized bed where the cooling of the particles can be finalized. In this case, the drops need only have solidified on the surface when they reach the fluidizing bed. It is also possible to allow the drops, after solidification, to slip or slide along an inclined cooling surface where the final cooling takes place. The inclined cooling surface may, of course, consist of coiled tubing which is surrounded by some suitable coolant.

The apparatus according to the invention will be further described with reference to the accompanying drawings and the invention will be defined in the following claims.

Figure 2:
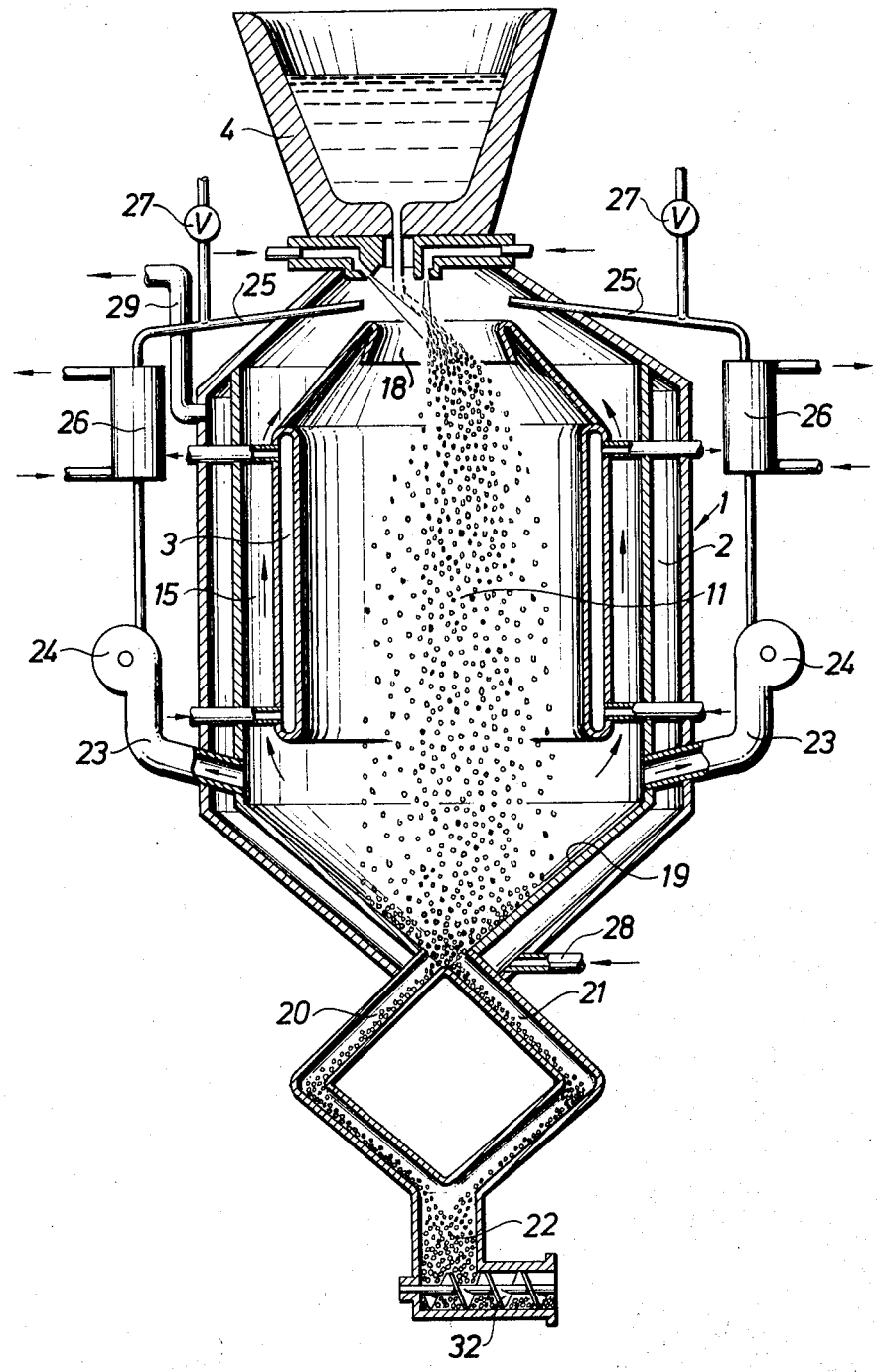

FIG. 1 shows a cross section of an apparatus according to the invention, whereas FIG. 2 shows a modification of said apparatus.

The device shown in FIG. 1 consists of anatomizing chamber 1, provided with an outer cooling jacket 2 and inner cooling jackets or heat-exchangers 3. A suitable coolant, for example water, flows in the cooling jackets. The cooling jacket 2 is provided with an inlet 28 and an outlet 29 for the coolant, while the cooling jackets 3 has hot coolant inlets 30 and outlets 31. At the upper part of the atomizing chamber 1 a tundish 4 is arranged, provided with a tapping hole 5 at the bottom, through which a tapping stream 6 of the molten material, for example the metal to be atomized, falls down into the chamber 1. On each side of the tapping hole 5, opposite to each other, are two slit orifices 7 and 8. The orifices extend in a plane substantially at right angles to the plane of the figure. The orifice 7 directs a flat jet 9 of a suitable fluid, for example argon, at an angle of about 45° against the tapping stream 6. This first fluid jet forces the stream of molten material to alter direction and also to a certain extent, splits the melt in the stream of molten material into drops. The molten material thus spreads out to form a layer on top of the fluid jet. The stream of molten material is then intersected by a second fluid jet 10 from the nozzle 8 at such a distance from the intersection between the stream of molten material and the first fluid jet 9 that most of the molten material has time to alter direction. The second fluid jet, which is substantially parallel to the original direction of the tapping stream, completes the separation of the molten material into drops and spreads this as a shower 11 in the chamber 1. The drops are cooled during their free fall through the chamber and are collected in a fluidized bed 12 at the lower end of the chamber 1. The fluidized bed is maintained by the addition of argon through a number of gas inlets 13 in the lowermost part of the chamber 1. The drops of moltem material which have solidified to powder are fed continuously out of the chamber through the outlet 14, through which excess argon can also be removed. The level of the fluidized bed is thus maintained constant.

Between the two cooling jackets 2 and 3 an annular channel 15 is formed which is in communication with the lower part of the chamber 1 at 16 immediately above the fluidized bed 12, and which is in communication with the upper part of the chamber 1 at 17 in the vicinity of the intersections of the jets 6, 9 and 10 with each other. A throttling flange 18 is arranged around the intersections so that this part of the device will operate as a jet pump in which, by ejector action, the movement of the fluid jets will also draw the atmosphere existing in the channel 15. The atmosphere of the chamber 1, which preferably consists of some inert gas, preferably argon, will therefore circulate through the inside of the chamber 1 and back through the channel 15. Since the channel 15 runs between the two cooling jackets 2 and 3 it will also serve as a heat-exchanger. Consequently, because of the special shape of the upper part of the chamber 1, warm gas will be drawn away from the lower part of the chamber while cold gas is constantly supplied to the upper part. The cooling of the drops of molten material produced will therefore be greatly accelerated and the chamber 1 can be made considerably shorter than would otherwise be necessary for the drops to be able to solidify during their free fall. The channel or heat-exchanger 15 may of course consist of one or more heat-exchangers arranged completely outside the chamber 1. The fluidized bed 12 is not absolutely necessary but may be useful in resulting in a shorter apparatus, because the drops need only have solidified on the surface when they reach the fluidized bed. As an example of the importance of the height of the atomizing chamber, as far as costs are concerned, it may be mentioned that the height of the atomizing chamber for atomizing high-speed tool steel should be about eight meters if the drops are only cooled during their free fall without any special arrangements. With a device according to the invention, this height can be considerably reduced, thus resulting in savings in cost.

The device shown in FIG. 2 is a modification of the device according to FIG. 1 and those parts which are the same in both figures have therefore been given the same reference characters.

However, in FIG. 2 some of these common reference characters have been omitted in order to emphasize the essentials of the figure. The molten material flowing from the tundish 4 is atomized in accordance with the method described in connection with FIG. 1, but the drops which have solidified to form powder particles are not finally cooled in a fluidized bed. Instead they are collected on the inclined and cooled bottom plane 19 of the chamber 1 from where they are distributed over additional inclined cooling surfaces 20 and 21 along which the powder particles may slide until they have been cooled to such an extent that they can be collected at the outlet 22 without there being any risk of the particles sticking together. The powder is removed through a screw conveyor 32. Since the cooling surfaces 20 and 21 are inclined the risk of the powder particles being deformed is reduced, and since the final cooling takes place while the particle is still moving along these cooling surfaces, there is no risk of the particles sticking together even at temperatures at which this might otherwise be a big problem. The bottom surface 19 of the chamber 1 is cooled by the lower part of the cooling jacket 2. The cooling surfaces 20 and 21, which in the example shown in FIG. 2 may consist of tubes, may either be provided with separate cooling jackets or surrounded by, for example, a circulating cooling medium. The inclined cooling surfaces may be designed in many different ways and the example illustrated consisting of a number of tubes 20 and 21 is only one embodiment.

In order to increase the internal gas circulation in the chamber 1 to cool the drops, a part of the atmosphere is removed from the chamber through conduits 23, the atmosphere in this case suitably consisting of an inert gas, for example argon, at the lower part of the chamber and compressed by pumps 24 to a higher pressure. The gas is then returned under this higher pressure through the conduits 25 to the upper part of the chamber 1 in the vicinity of the throttling flange 18. The conduits 25 are provided with outlet valves 27 for excess argon. Excess argon can also be removed from the chamber through the valve 32. The gas circulation through the chamber 1 can be considerably increased in this way in spite of the fact that the energy supplied to the pumps 24 is relatively small. The movement of the fluid jets is used at the same time for circulating the gas through the channel 15. If desired, the circulation pumps may be placed in the channel 15 or its extension and not, as in this example, parallel with the channel 15. If the gas being forced to circulate is supplied under pressure, care must of course be taken to see that this does not affect the atomizing process unfavourably. The gas being forced to circulate, may also be supplied at the same pressure as that prevailing inside the chamber, but this requires some alterations of the arrangement shown in FIG. 2. In order to cool the circulating gas the conduits 25 may be provided with cooling jackets 26.

The means according to the invention is not limited to what is described in connection with these drawings, but can be varied in accordance with the basic idea of the invention.

What we claim is:

1. A device for converting molten metal to a fine metal powder which comprises an atomizing chamber having an upper portion for atomizing a stream of molten metal into droplets, a lower portion for collecting and discharging the metal powder, and an intermediate portion for cooling and solidifying said droplets, the intermediate portion of said chamber comprising an outer cooling jacket forming an exterior wall and an inner cooling jacket spaced from and within the outer cooling jacket to form an annular passage for upward movement of cooling gas and an inner passage for downward movement of solidifying metal droplets, the upper portion of said chamber having an inlet opening for the molten metal to form a continuous and descending stream of molten metal, a first slit orifice below and to one side of said inlet for delivering a first flat jet of argon gas to split the stream of molten metal into a layer of droplets, said first jet having a width exceeding the width of the stream of molten metal and intersecting said stream at an angle of about 45°, a second slit orifice to the other side of the inlet for delivering a second flat jet of argon gas to intersect and complete atomization of said stream of molten metal, said second jet being substantially parallel to the initial stream of molten metal and being directed into the inner passage of the intermediate portion of the chamber to effect downward movement therethrough of solidifying metal droplets and argon gas and upward movement of said gas through the annular passage.

* * * * *